United States Patent
Bamba

(10) Patent No.: US 7,650,426 B2
(45) Date of Patent: Jan. 19, 2010

(54) METHOD OF AND APPARATUS FOR COMMUNICATION, AND COMPUTER PRODUCT

(75) Inventor: Masakazu Bamba, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 682 days.

(21) Appl. No.: 10/789,607

(22) Filed: Feb. 27, 2004

(65) Prior Publication Data

US 2005/0055459 A1 Mar. 10, 2005

(30) Foreign Application Priority Data

Sep. 9, 2003 (JP) .............................. 2003-317117

(51) Int. Cl.
*G06F 15/173* (2006.01)
(52) U.S. Cl. ....................... 709/238; 709/231; 709/234; 709/239; 709/242
(58) Field of Classification Search ......... 709/234–235, 709/238–242, 231; 370/229–235, 237–238, 370/254–255
See application file for complete search history.

(56) References Cited

U.S. PATENT DOCUMENTS

| | | | |
|---|---|---|---|
| 6,363,319 B1 * | 3/2002 | Hsu | 701/202 |
| 6,658,479 B1 * | 12/2003 | Zaumen et al. | 709/238 |
| 6,795,399 B1 * | 9/2004 | Benmohamed et al. | 370/235 |
| 6,831,895 B1 * | 12/2004 | Ji et al. | 370/237 |
| 2003/0174644 A1 * | 9/2003 | Yagyu | 370/228 |
| 2003/0193898 A1 * | 10/2003 | Wong et al. | 370/252 |

FOREIGN PATENT DOCUMENTS

| | | |
|---|---|---|
| EP | 1 005 195 A3 | 5/2000 |
| JP | 2-22948 | 1/1990 |
| JP | 5-130144 | 5/1993 |
| JP | 2003-198727 | 7/2003 |
| JP | 2003-209568 | 7/2003 |
| JP | 2003-218917 | 7/2003 |

OTHER PUBLICATIONS

Notice of Rejection dated Aug. 5, 2008, from the corresponding Japanese Application.

* cited by examiner

*Primary Examiner*—Frantz B Jean
(74) *Attorney, Agent, or Firm*—Katten Muchin Rosenman LLP

(57) ABSTRACT

A communication apparatus, in a communication network in which a plurality of routes can be set with respect to a destination, acquires a line condition of a communication line in each route, calculates a communication cost of each route, based on the line condition of the communication line in the route, and selects a route from the plurality of routes based on the communication cost calculated. The line condition is acquired at regular intervals to thereby update the communication cost.

17 Claims, 6 Drawing Sheets

FIG.3A

| COMMUNI-CATION LINE | BAND (bps) | USAGE (bps) | UNUSED (bps) | COST | NOTE |
|---|---|---|---|---|---|
| E1 | 100M | 0 | 100M | 0.01 | NO FAILURE |
| E2 | 100M | 0 | 100M | 0.01 | NO FAILURE |
| E3 | 10M | 0 | 10M | 0.1 | NO FAILURE |
| E4 | 10M | 0 | 10M | 0.1 | NO FAILURE |
| E5 | 10M | 0 | 10M | 0.1 | NO FAILURE |
| E6 | 100M | 0 | 100M | 0.01 | NO FAILURE |
| E7 | 600M | 0 | 600M | 0.00017 | REDUNDANT CONFIGURATION (1+1-APS) NO FAILURE |

FIG.3B

| COMMUNI-CATION LINE | BAND (bps) | USAGE (bps) | UNUSED (bps) | COST | NOTE |
|---|---|---|---|---|---|
| E1 | 100M | 0 | 100M | 0.01 | NO FAILURE |
| E2 | 100M | 50M | 50M | 0.02 | NO FAILURE |
| E3 | 10M | 5M | 5M | 0.2 | NO FAILURE |
| E4 | 10M | 2M | 8M | 0.125 | NO FAILURE |
| E5 | 10M | 2M | 8M | 0.125 | NO FAILURE |
| E6 | 100M | 10M | 90M | 0.011 | NO FAILURE |
| E7 | 600M | 50M | 550M | 0.0018 | REDUNDANT CONFIGURATION (1+1-APS) NO FAILURE |

FIG.3C

| COMMUNI-CATION LINE | BAND (bps) | USAGE (bps) | UNUSED (bps) | COST | NOTE |
|---|---|---|---|---|---|
| E1 | 100M | 0 | 100M | 0.01 | NO FAILURE |
| E2 | 100M | 50M | 50M | 0.02 | NO FAILURE |
| E3 | 10M | 5M | 5M | 5.0 | FAILURE (LSC) |
| E4 | 10M | 2M | 8M | 0.125 | NO FAILURE |
| E5 | 10M | 2M | 8M | 0.125 | NO FAILURE |
| E6 | 100M | 10M | 90M | 0.011 | NO FAILURE |
| E7 | 600M | 50M | 550M | 0.009 | REDUNDANT CONFIGURATION (1+1-APS) FAILURE (LOS) |

FIG.4A

| FAILURE DETAILS | NAME OF ALARM | FAILURE COST COEFFICIENT |
|---|---|---|
| LOSS OF SIGNAL | LOS(Loss Of Signal) LOC(Loss Of Carrier) | 50 |
| LOSS OF SYNCHRONISM | LSC(Loss Of Synchronize) | 25 |
| LINE DISTURBANCE | Pause Frame TRANSMISSION PAIS TRANSMISSION | 10 |

FIG.4B

| REDUNDANT CONFIGURATION | REDUNDANT COST COEFFICIENT |
|---|---|
| BLSR(Bidirectional Line Switched Rings) | 50 |
| UPSR(Unidirectional Protection Switched Ring) | 30 |
| 1+1-APS(Automatic Protection Switching) | 10 |

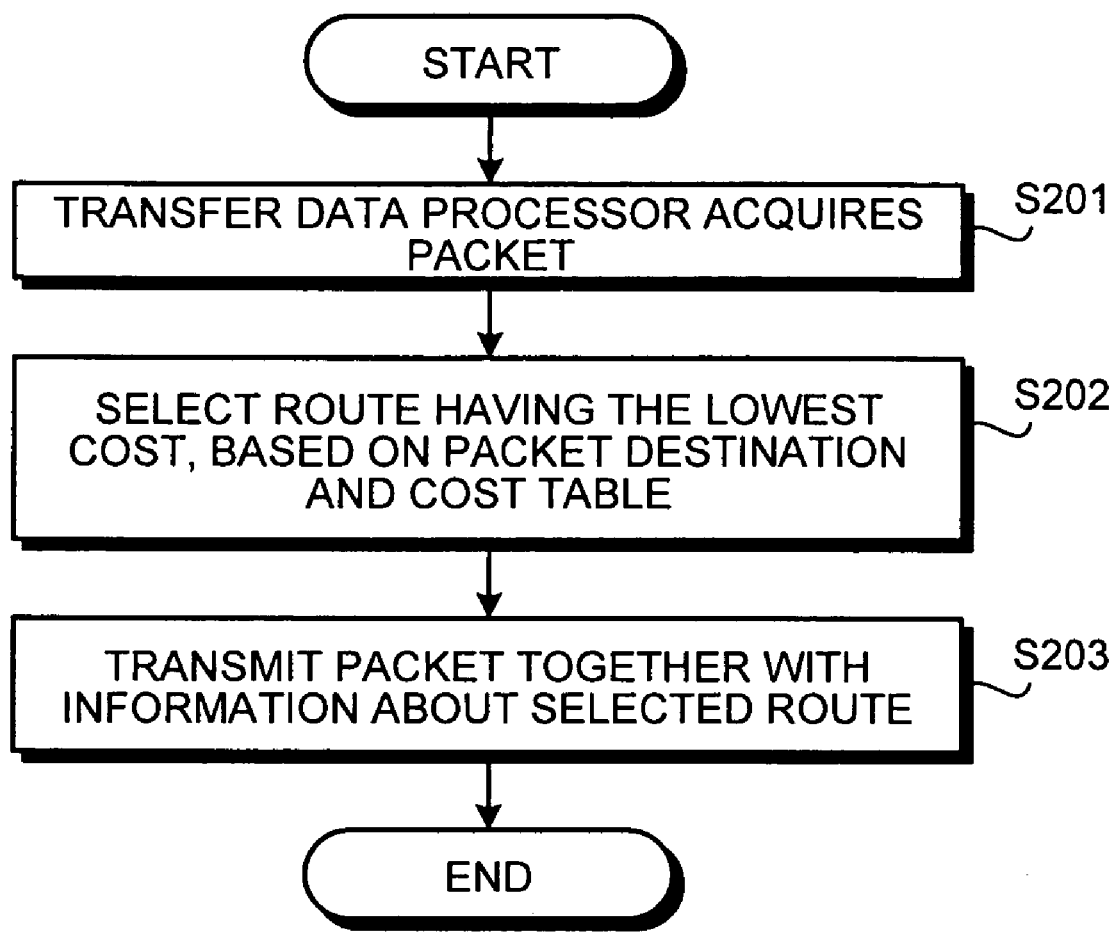

METHOD OF AND APPARATUS FOR COMMUNICATION, AND COMPUTER PRODUCT

BACKGROUND OF THE INVENTION

1) Field of the Invention

The present invention relates to a technology for recognizing dynamically a change in route conditions in a network and selecting an optimum route for transmission of data.

2) Description of the Related Art

In a network, when a device transmits data to another device, the data passes through a plurality of nodes. The nodes may be transmission apparatuses, switchboards, switches, routers, wavelength division multiplexing (WDM) apparatuses, asynchronous transfer mode (ATM) apparatuses, optical cross-connectors, and fiber channels.

Depending on the topology of the network, there may be numerous possible routes for the data. Along the path to the destination, each node needs to select a route for transmitting the data further. Generally, a communication cost between nodes is set in advance, and the nodes select the route based on the communication cost set.

The communication cost is a value, which is an index of the condition of the communication line connecting the nodes. Conventionally, the communication cost in each communication line is set empirically based on factors such as the line speed of the communication line. For example, the greater the priority level of a communication line, the lower is its communication cost. Moreover, the higher is the line speed, the lower is its communication cost.

Each route to the destination includes a plurality of communication lines. In the conventional communication apparatus, a sum total of the communication costs of the communication lines included in a route is calculated. The communication apparatus selects the route having the lowest value of the communication cost, so that the data can be transmitted to the destination efficiently and quickly. The communication apparatus serves as a node.

There are various methods of selecting the route of transmission using the communication cost. A network design method in Japanese Patent Application Laid-open No. H10-207934 discloses a method for solving a mathematical plan problem. This network design method assumes a plurality of routes to the destination of data, sets a restrictive condition such that the communication cost in each route does not exceed a predetermined value, and specifies an optimum route by finding out an objective function with the lowest communication cost of the route.

In a communication network design apparatus disclosed in Japanese Patent Application Laid-open No. 2000-165451, a plurality of nodes are arranged to optimize the topology of the network, taking into consideration the maximum line speed and the minimum line speed between nodes, and a preset communication cost is used for determining whether the arrangement of the respective nodes is optimum.

However, there are some problems in applying methods involving communication cost, to the conventional apparatus. Once a communication cost between respective nodes is set, the same communication cost is used, unless a network administrator changes the value. Moreover, because the quantity of data that passes through the communication line is not always constant, the line speed of the communication line may be used to its maximum, or may not be used at all. Furthermore, the service condition of a communication line changes with the lapse of time. In such a case, the communication cost of that communication line must change accordingly. However, in the conventional apparatus, the communication cost can be corrected only by the network administrator on recognizing the failure. Therefore, the nodes may try to use the faulty communication line, and hence smooth data transmission is not possible.

Thus, in the conventional communication apparatus, there is a problem in that the preset communication cost of the communication line may not always correspond to the actual condition of the communication line. In fact, it is very important to allow the communication cost to dynamically correspond to a change in the condition of the communication line to ensure that data reaches the destination quickly and without error.

SUMMARY OF THE INVENTION

It is an object of the present invention to solve at least the problems in the conventional technology.

A communication apparatus in a communication network in which a plurality of routes can be set with respect to a destination, according to an aspect of the present invention, includes a line condition acquiring unit that acquires a line condition of a communication line in each route; a communication cost calculating unit that calculates a communication cost of each route, based on the line condition of the communication line in the route; and a route selecting unit that selects a route from the plurality of routes based on the communication cost calculated.

A method of communication realized on a communication apparatus in a communication network in which a plurality of routes can be set with respect to a destination, according to another aspect of the present invention, includes acquiring a line condition of a communication line in each route; calculating a communication cost of each route, based on the line condition of the communication line in the route; and selecting a route from the plurality of routes based on the communication cost calculated.

A computer program according to still another aspect of the present invention realizes on a computer the method according to the above aspect.

The other objects, features, and advantages of the present invention are specifically set forth in or will become apparent from the following detailed descriptions of the invention when read in conjunction with the accompanying drawings.

BRIEF DESCRIPTION OF THE DRAWINGS

FIG. 3A illustrates initial contents of a cost table;

FIG. 3B illustrates contents of the cost table;

FIG. 3C illustrates contents of the cost table when a failure occurs;

FIG. 4A illustrates a table for specifying a cost coefficient with respect to a failure;

FIG. 4B illustrates a table for specifying a cost coefficient with respect to a redundant configuration;

FIG. 6 is a flowchart of a process for transmitting a packet to a predetermined destination.

DETAILED DESCRIPTION

Exemplary embodiments of a method of and apparatus for communication according to the present invention will be explained in detail, with reference to the accompanying drawings.

Figure 1:
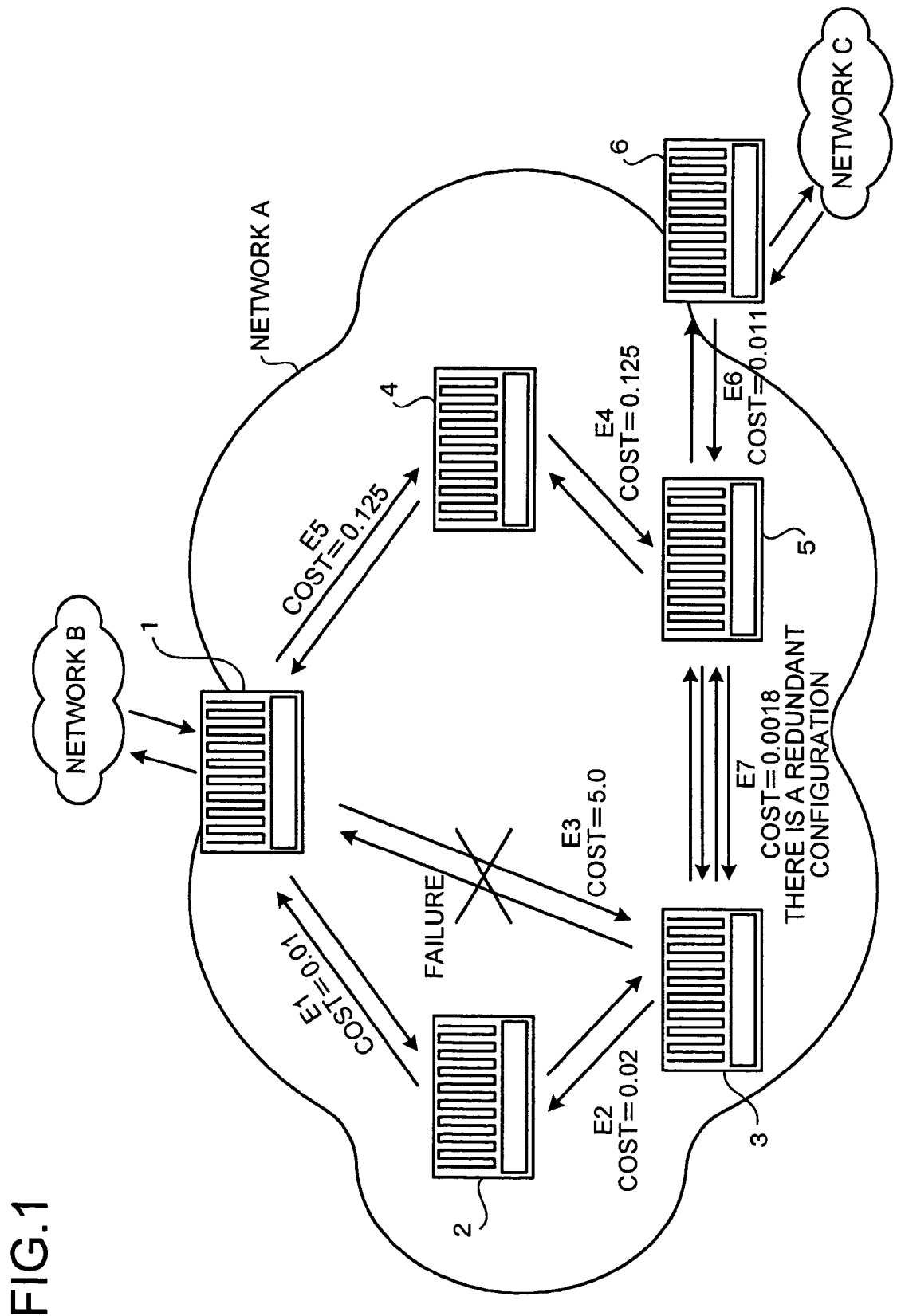
FIG. 1 illustrates a concept of a communication apparatus according to an embodiment of the present invention.

FIG. 1 illustrates a concept of the communication apparatus according to an embodiment of the present invention. The communication apparatus serves as a node. A network A includes nodes 1 to 6 that are connected with each other via communication lines E1 to E7. The network A is connected to a network B via the node 1, and to a network C via the node 6.

A communication cost is a value assigned to each of the communication lines E1 to E7, based on the condition of the communication line. For a communication line, the higher the line speed currently available, the lower is the communication cost. When a failure such as loss of signal, loss of synchronism, or line disturbance occurs in the communication line, the communication cost is a high value. Thus, a low communication cost indicates a favorable condition, whereas a high communication cost indicates an unfavorable condition.

The communication costs of the communication lines E1 through E7 are 0.01, 0.02, 5.0, 0.125, 0.125, 0.011, and 0.0018, respectively.

If a redundant configuration such as bidirectional line switched rings (BLSR), unidirectional protection switched ring (UPSR), and 1+1 automatic protection switching (APS) exists between the nodes, as in the communication line E7, the communication cost of such a line is low.

The communication cost of the communication line E3 is more than that of other communication lines, because a failure occurs in the line. The communication cost of each of the communication lines E1 through E7 is corrected based on the line speed, the presence of a failure, or the presence of a redundant configuration.

When a node receives a packet of data, the node selects a route having the lowest communication cost, from a plurality of routes to the destination of the packet, and transmits the packet. Because a route to the destination includes a plurality of communication lines, the sum total of the communication costs of the communication lines included in the route becomes the communication cost of that route.

Consider an example with reference to FIG. 1. If the node 1 receives a packet from the network B, there are three possible routes for transmitting the packet to the network C via the node 6. That is, there are a first route passing through the communication lines E1, E2, E7, and E6, a second route passing through the communication lines E3, E7, and E6, and a third route passing through the communication lines E5, E4, and E6.

The communication cost of the first route is 0.00428, the communication cost of the second route is 5.0128, and the communication cost of the third route is 0.261.

Therefore, the node 1 selects the first route, which has the lowest communication cost, for transmitting the packet further, so that the packet can reach the network C more quickly and efficiently, than through the second or the third route.

Figure 2:
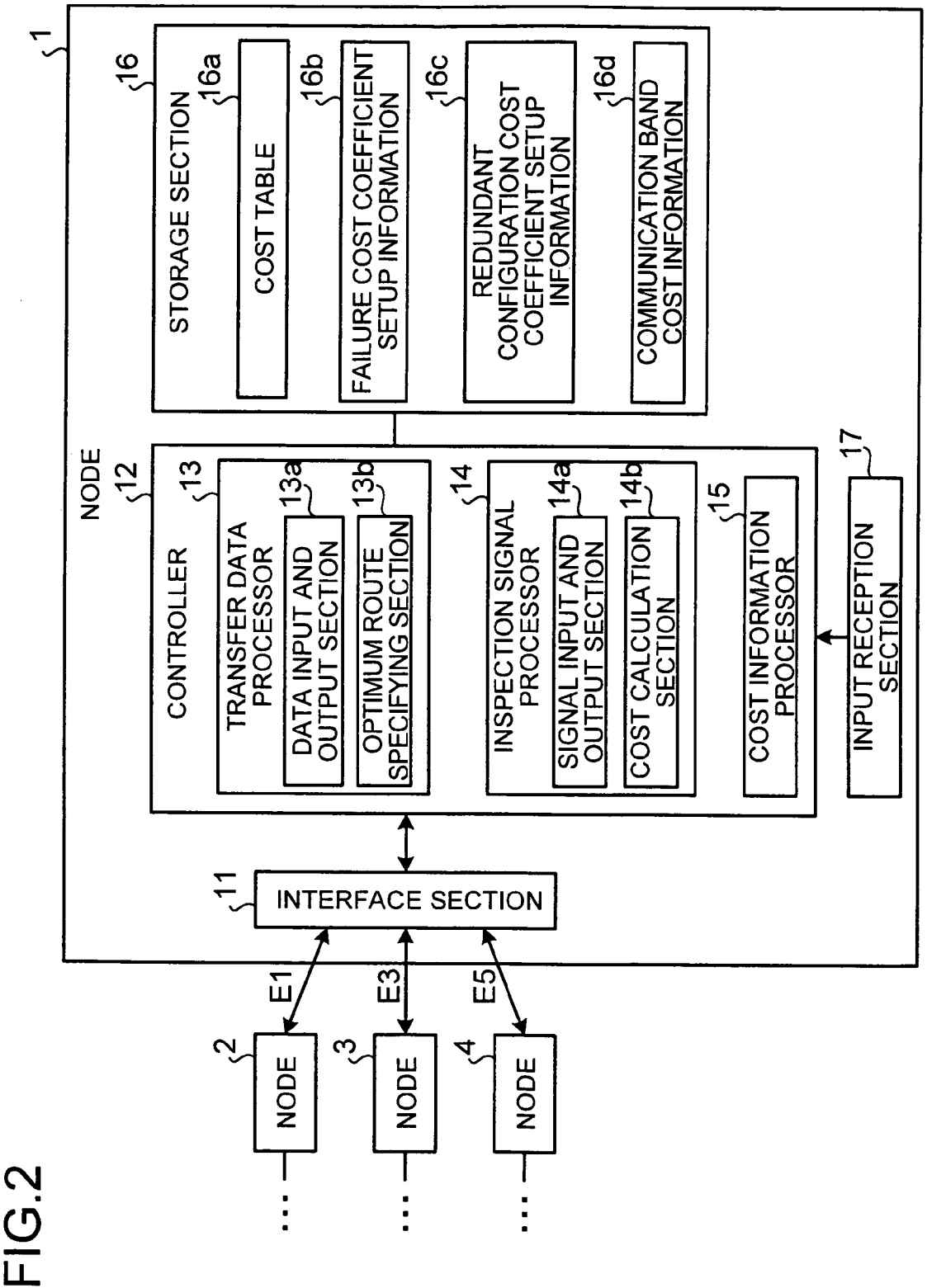
FIG. 2 illustrates a schematic configuration of the communication apparatus.

FIG. 2 illustrates a schematic configuration of the communication apparatus. As shown in this figure, the nodes 1 to 4 are connected with each other via the communication lines. Though not shown, the node 1 is connected with a node in the network B. Because the nodes 1 to 4 have identical configuration, the node 1 will be explained here as an example.

The node 1 includes an interface section 11, a controller 12, a storage section 16, and an input reception section 17. The interface section 11 is a network interface for communicating between the nodes 1 to 4.

Upon reception of the packet, the controller 12 selects a route for transmitting the packet based on the communication costs of the communication lines E1 to E7 in the network A. The controller 12 acquires the communication costs of the communication lines E1 to E7 in the network A, at predetermined intervals. The controller 12 includes a transfer data processor 13, an inspection signal processor 14, and a cost information processor 15.

The transfer data processor 13 includes a data input and output section 13a and an optimum route specifying section 13b. The data input and output section 13a acquires a packet input from either the network B or any of the nodes 2 to 4, and sends the destination information of the packet to the optimum route specifying section 13b.

Then the optimum route specifying section 13b calculates the communication cost of all routes to the destination of the packet, based on a cost table 16a stored in the storage section 16, and specifies a route having the lowest communication cost. The optimum route specifying section 13b then sends the information of the route specified, to the data input and output section 13a. The data input and output section 13a transmits the packet, together with the input route information, to the destination.

FIGS. 3A, 3B, 3C illustrate contents of the cost table 16a. The cost table 16a stores information on a band, a usage value, an unused value, a cost, and a note, for each of the communication lines E1 to E7. The cost table 16a is corrected based on the line speed currently used, and the presence of a failure or a redundant configuration.

The "band" expresses the maximum line speed of the communication line, the "usage" expresses the line speed currently used by the communication line, and "unused" expresses a difference between the "band" and the "usage". In other words, "unused" stands for the remaining line speed of the communication line. "Cost" expresses the communication cost, and "note" expresses the condition of the communication line (failure or redundant configuration). That is, when there is a failure in the communication line, "note" expresses the details of the failure, and when there is a redundant configuration in the communication line, "note" expresses the details of the redundant configuration.

The inspection signal processor 14 calculates the communication costs of the communication lines E1, E3, and E5. On receiving an inspection signal from any of the nodes 2 to 4, the inspection signal processor 14 outputs a response signal to the node that sent the inspection signal. The inspection signal processor 14 includes a signal input and output section 14a and a cost calculation section 14b.

The signal input and output section 14a outputs an inspection signal to the communication lines E1, E3, and E5. The signal input and output section 14a then acquires response signals from the communication lines E1, E3, and E5, and recognizes the currently used line speed, the maximum line speed, the presence of a failure, and the presence of the redundant configuration in the communication lines E1, E3, and E5, and sends this information to the cost calculation section 14b.

If there is a failure in the communication line or a redundant configuration, the signal input and output section 14a recognizes the details of the failure or those of the redundant configuration. When an inspection signal is received from any of the nodes 2 to 4, the signal input and output section 14a sends a response signal to the node that sends the inspection signal.

The cost calculation section 14b calculates the communication cost of each of the communication lines E1, E3, and E5, based on the currently available line speed, the presence of a failure and its details (if any), and the presence of the redundant configuration and its details (if any) of the communication lines E1, E3, and E5.

There is a separate formula for calculating the communication cost for each situation. For example, a situation in which there is no failure and no redundant configuration in the communication line, a situation in which only a failure is present in the communication line, a situation in which only a redundant configuration exists in the communication line, and a situation in which a failure and a redundant configuration both exist in the communication line. In other words, the cost calculation section 14b uses four kinds of calculation formulae.

The formula for calculating the communication cost where there is no failure and no redundant configuration in the communication line is as described below:

Communication cost=1/{unused band×(1/unit cost)}.

The unused band represents a difference between the maximum line speed of the communication line and the currently used line speed. As an example, when the maximum line speed of the communication line is 10 megabits per second and the currently used line speed is 5 megabits per second, the unused band becomes 5 megabits per second. The unit cost is stored in a communication band cost information 16d, and is a value for determining the cost per unit line speed. In this embodiment, the unit cost is designated as 1 megabit per second.

The formula for calculating the communication cost when only a failure is present in the communication line is as described below:

Communication cost=1/{unused band×(1/unit cost)× (1/failure cost coefficient)}.

FIG. 4A illustrates a table for specifying a cost coefficient with respect to a failure. The type of the failure determines the failure cost coefficient. The failure cost coefficient is 50 for loss of signal, 25 for loss of synchronism, and 10 for line disturbance. The table shown in FIG. 4A is stored in failure cost coefficient setup information 16b.

The details of the failure are determined from the response signal acquired by the signal input and output section 14a. If the failure is Loss Of Signal (LOS) or Loss Of Carrier (LOC), the failure detail is stored as loss of signal. If the failure is Loss of Synchronism (LSC), the failure detail is stored as loss of synchronism. If the failure is Pause Frame transmission or Path Alarm Indication Signal (PAIS) transmission, the failure detail is stored as line disturbance.

The formula for calculating the communication cost when only a redundant configuration exists in the communication line is as described below:

Communication cost=1/{unused band×(1/unit cost)× redundant cost coefficient}.

FIG. 4B illustrates a table for specifying a cost coefficient with respect to a redundant configuration. The redundant cost coefficient is determined by the redundant configuration. The redundant cost coefficient is 50 in the case of BLSR, 30 in the case of UPSR, and 10 in the case of 1+1 APS. The table shown in FIG. 4B is stored in redundant configuration cost coefficient setup information 16c. The details of the redundant configuration are determined from the response signal acquired by the signal input and output section 14a.

The formula for calculating the communication cost when a failure and a redundant configuration both are present in the communication line, is as described below:

Communication cost=1/{unused band×(1/unit cost)× (1/failure cost coefficient)×redundant cost coefficient}.

The cost calculation section 14b selects the calculation formula based on the condition of the communication line, and hence, the most appropriate communication cost is assigned to the communication line.

A user can also change the communication cost of the communication lines E1 to E7, if needed. Therefore, when a packet is not allowed to pass through a specific communication line intentionally, for example, when a router is being adjusted, the communication cost for the specific communication line can be increased manually. The communication cost for each communication line in the cost table 16a can be changed using the input reception section 17.

The cost information processor 15 outputs the information of "band", "usage", "unused", "cost", and "note" (hereinafter, "communication cost information") for the communication lines E1, E3, and E5.

The cost information processor 15 acquires the communication cost information of the communication lines E2, E4, E6, and E7 from the nodes 2 to 4, and updates the cost table with the communication cost information acquired. The nodes 2 to 6 can exchange the communication cost information of the communication lines.

Thus, the nodes 1 to 6 can dynamically acquire the communication cost of all the communication lines E1 to E7 in the entire network A.

Figure 5:
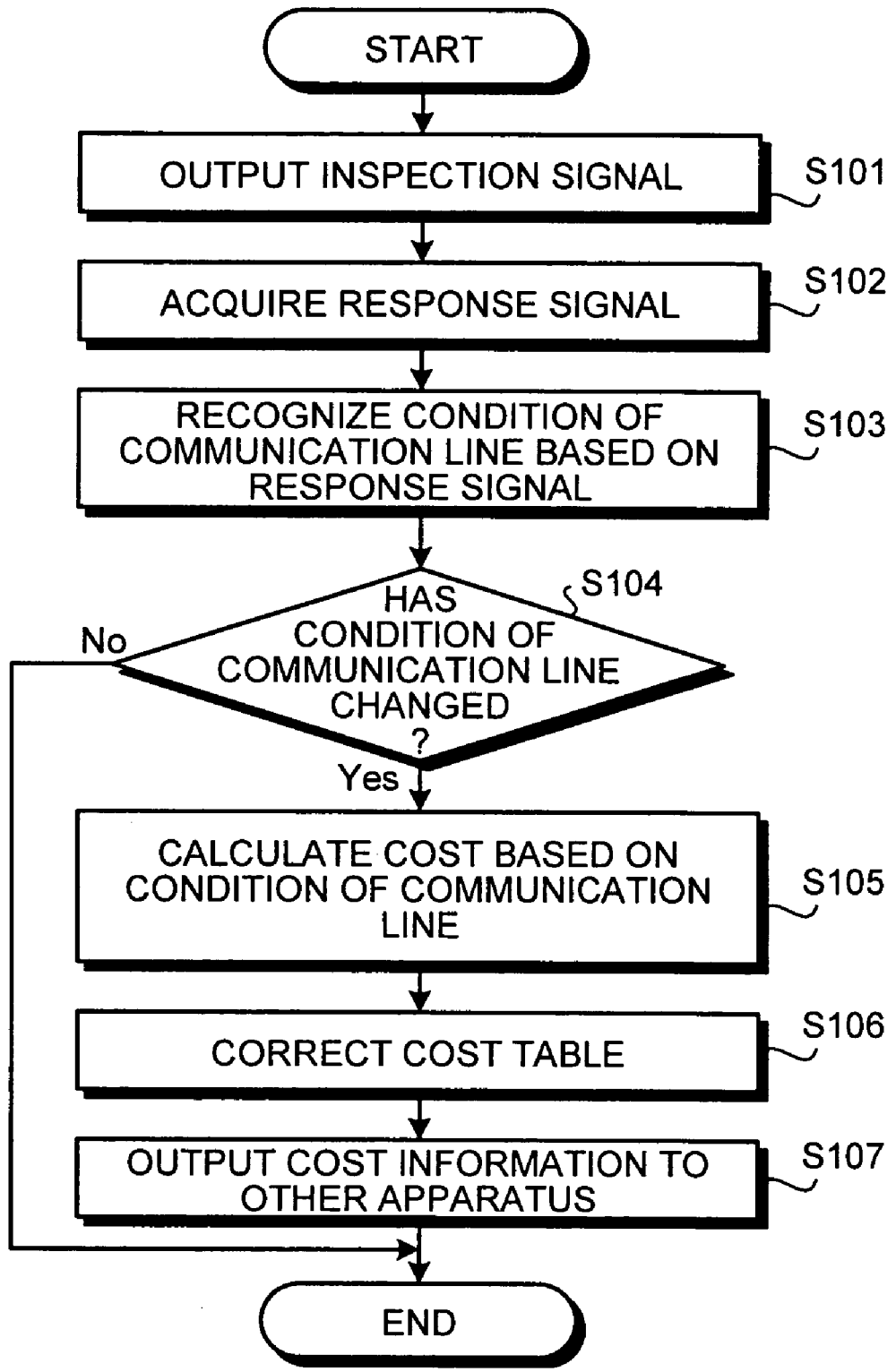
FIG. 5 is a flowchart of a process for calculating the communication cost of a communication line.

The procedure used by the node 1 to calculate the communication cost of a communication line will be explained below with reference to the flowchart in FIG. 5. This process is repeatedly executed during the operation of the node 1. The signal input and output section 14a outputs the inspection signal to the communication lines E1, E3, and E5 (step S101), and acquires response signals from the communication lines E1, E3, and E5 (step S102).

Based on the response signals acquired, the signal input and output section 14a recognizes the condition of the communication line, such as the maximum communication line speed, the currently used communication line speed, the presence of a failure (and when there is a failure, the details thereof), and the presence of the redundant configuration (and when there is the redundant configuration, the details thereof) (step S103).

The signal input and output section 14a compares the cost table 16a with the information acquired at step S103, to check whether the condition of the communication line has changed (step S104).

If the condition of the communication line has not changed (No at step S104), the process is terminated. On the other hand, if the condition of the communication line has changed (Yes at step S104), the signal input and output section 14a specifies the remaining line speed of the communication line from a difference between the maximum communication line speed and the currently used line speed.

If a failure and a redundant configuration exist in the communication line, the cost calculation section 14b specifies the failure cost coefficient and the redundant cost coefficient. The cost calculation section 14b then calculates the communication cost of the communication line based on the information specified (step S105).

The cost calculation section 14b updates the communication cost information in the cost table (step S106). The cost information processor 15 outputs the communication cost information in the corrected cost table 16a to the nodes 2 to 4 (step S107), and the process is terminated.

The node 1 monitors the condition of the communication lines E1, E3, and E5 all the time. Therefore, when the condition of a communication line changes, the node 1 calculates the communication cost again, and updates the cost table 16a. Consequently, accuracy of the communication cost of the communication lines E1, E3, and E5 is maintained.

When the node 1 acquires the communication cost information from the nodes 2 to 4, the node 1 updates the cost table 16a. Therefore, the node 1 can recognize the communication cost information of all the communication lines in the network A.

The process when the node 1 acquires a packet, and transmits the packet to a predetermined destination will be explained below with reference to the flowchart in FIG. 6. The transfer data processor 13 acquires a packet transmitted from either the network B or any of the nodes 2 to 4 (step S201).

The optimum route specifying section 13b selects a route having the lowest communication cost, based on the packet destination and the cost table 16a (step S202). The data input and output section 13a outputs the packet together with the information about the route selected to any of the nodes 2 to 4 (step S203), and the process is terminated.

In this manner, the node 1 selects a route having the lowest communication cost, from a plurality of transmission routes, based on the input packet destination, and transmits the packet together with the route information, so that the packet passes through the selected route. As a result, the packet can reach the predetermined destination quickly and reliably.

The node 1 according to the embodiment of the present invention monitors the condition of the communication lines E1, E3, and E5, calculates the communication cost of the communication line if the condition of the line changes, updates the cost table 16a, and outputs the updated communication cost information to the nodes 2 to 4.

After acquiring the communication cost information from the nodes 2 to 4, the node 1 updates the cost table 16a. Therefore, the node 1 can recognize the condition of the communication lines E1 to E7 in the network A dynamically and automatically, and transmit the packet quickly and efficiently.

In the present embodiment, after having received the packet, the node 1 selects the route to the destination and transmits the packet together with the route information. After having acquired the packet, the respective nodes 2 to 6 transmit the packet to the destination based on the route information selected by the node 1. However, the present invention is not limited thereto. After having acquired the packet, the respective nodes 2 to 6 may select a route corresponding to the destination of the packet individually.

In the present embodiment, the communication cost information is transmitted between the nodes 1 to 6 for calculating the communication costs of the respective communication lines E1 to E7 in the network A. However, the present invention is not limited thereto. The configuration may be such that for example only a communication line name and the communication cost corresponding to that communication line are transmitted. In this way, the load on communication lines can be reduced.

In the present embodiment, the respective nodes 1 to 6 dynamically obtain the communication cost of the respective communication lines E1 to E7 in the network A. However, it is a matter of course that the communication cost can be obtained for the other communication lines existing in the networks B and C, and other networks as well.

The method according to the present invention may be realized by executing a computer program that a computer. The computer program may be stored on a hard disc of the computer or on a portable computer-readable storing medium.

In the present embodiment, the packet transmission method has been explained as an example, but the application of the present invention is not limited thereto. The present invention is also applicable to transmission by any communication method, so long as an optimum route to a predetermined destination is selected from a plurality of routes. For example, when audio is transmitted as an analog signal, the present invention can be used to select the optimum route.

Thus, according to the communication apparatus and the communication method of the present invention the data can be transmitted efficiently.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A communication apparatus in a communication network in which a plurality of routes can be set with respect to a destination, comprising:
    a line condition acquiring unit that acquires line condition information on a communication condition of a communication line in each route, the line condition information including failure information about presence or absence of a failure in the communication line;
    a communication cost calculating unit that determines a type of failure from among a plurality of types of failures and calculates a communication cost of each route, based on the line condition information in the route and the determined type of failure; and
    a route selecting unit that selects a route from the plurality of routes based on the communication cost calculated.

2. The communication apparatus according to claim 1, further comprising a communication cost outputting unit that outputs the communication cost to outside.

3. The communication apparatus according to claim 1, wherein the line condition acquiring unit acquires service condition information on a service condition of the communication line, and the communication cost calculating unit calculates the communication cost based on the service condition information.

4. The communication apparatus according to claim 1, wherein the line condition acquiring unit acquires reserve line information, that is information about presence or absence of a reserve line in the communication line, and if the reserve line exists, the communication cost calculating unit calculates the communication cost based on a type of the reserve line.

5. The communication apparatus according to claim 1, wherein the line condition acquiring unit acquires the line condition information at regular intervals.

6. The communication apparatus according to claim 1, further comprising an inputting unit to input a communication of each route, wherein
    the route selecting unit selects the route from the plurality of routes based on the communication cost input.

7. The communication apparatus according to claim 1, further comprising:
    a communication cost acquiring unit that acquires a communication cost of each route from outside, wherein the route selecting unit selects the route from the plurality of routes based on the communication cost acquired.

8. The communication apparatus according to claim 1, further comprising a storage unit to store the communication cost calculated.

9. A method of communication realized on a communication apparatus in a communication network in which a plurality of routes can be set with respect to a destination, comprising:

acquiring line condition information on a communication condition of a communication line in each route, the line condition information including failure information about presence or absence of a failure in the communication line;

determining a type of failure from among a plurality of types of failures;

calculating a communication cost of each route, based on the line condition information in the route and the determined type of failure; and selecting a route from the plurality of routes based on the communication cost calculated.

10. The method according to claim 9, further comprising outputting the communication cost to outside.

11. The method according to claim 9, wherein the acquiring includes acquiring service condition information on a service condition of the communication line, and the calculating includes calculating the communication cost based on the service condition information.

12. The method according to claim 9, wherein the acquiring includes acquiring reserve line information, that is information about presence or absence of a reserve line in the communication line, and if the reserve line exists, the calculating includes calculating the communication cost based on a type of the reserve line.

13. The method according to claim 9, wherein the acquiring is performed at regular intervals.

14. The method according to claim 9, further comprising manually inputting a communication cost of each route, wherein the selecting includes selecting the route from the plurality of routes based on the communication cost input.

15. The method according to claim 9, further comprising acquiring a communication cost of each route from outside, wherein the route selecting unit selects the route from the plurality of routes based on the communication cost acquired.

16. The method according to claim 9, further comprising storing the communication cost calculated.

17. A computer program for realizing communication on a communication apparatus in a communication network in which a plurality of routes can be set with respect to a destination, the computer program making the communication apparatus execute:

acquiring line condition information on a communication condition of a communication line in each route, the line condition information including failure information about presence or absence of a failure in the communication line;

determining a type of failure from among a plurality of types of failures;

calculating a communication cost of each route, based on the line condition information in the route and the determined type of the failure; and selecting a route from the plurality of routes based on the communication cost calculated.

\* \* \* \* \*